Patented Dec. 18, 1945

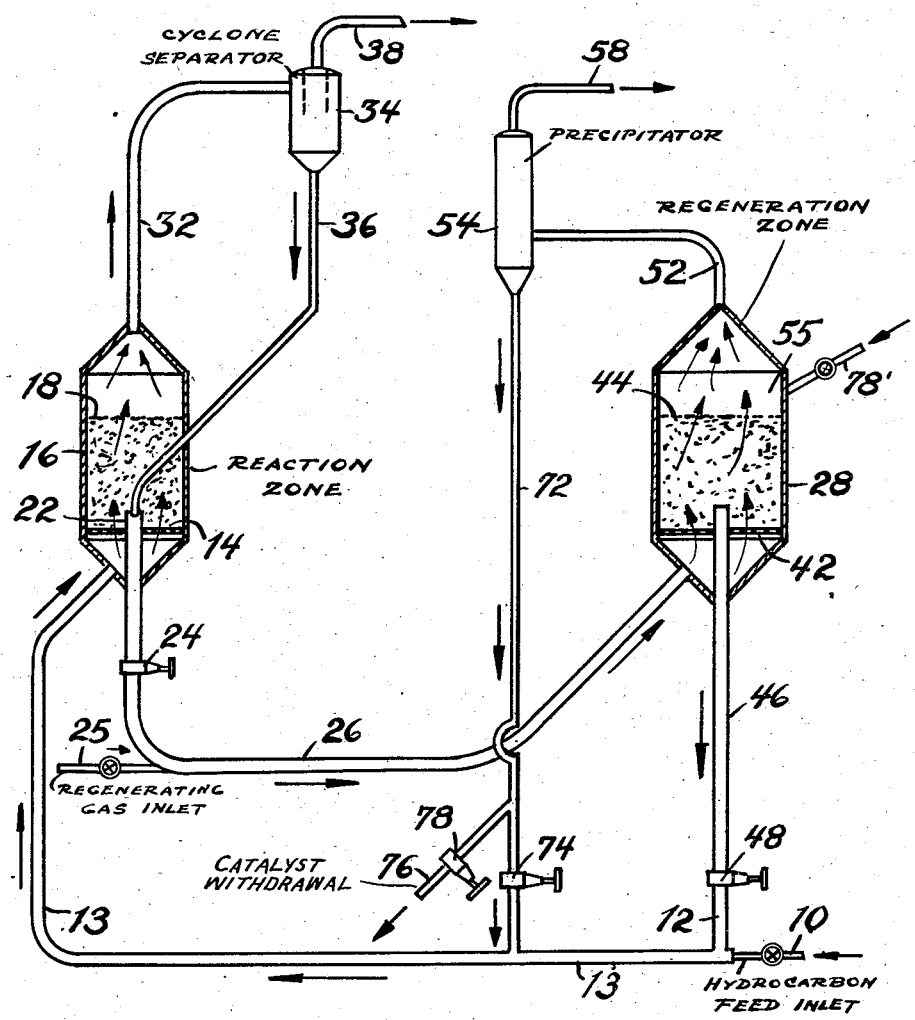

2,391,334

UNITED STATES PATENT OFFICE 2,391,334

TREATING HYDROCARBON FLUIDS

Edward W. S. Nicholson, Baton Rouge, La., assignor to Standard Oil Development Company, a corporation of Delaware Application August 27, 1942, Serial No. 456,319

6 Claims. (Cl. 196—52)

This invention relates to treating hydrocarbon fluids and more particularly relates to controlling the amount of catalyst fines in the powdered catalyst in the system.

In the conversion of hydrocarbons using powdered catalyst, it is found that some attrition of the catalyst occurs and the percentage of relatively small catalyst particles or fines is increased. These catalyst fines have certain disadvantages in powdered catalyst mixtures such as being hard to fluidize and producing lower pressures in standpipes used for developing pressure and lower concentration of catalyst in reaction or regeneration vessels. It is advantageous to remove at least a portion of these finely divided catalyst particles or fines selectively in order to prevent building up too high a concentration of fines, using the same equipment used for the conversion of hydrocarbons by changing the conditions of operation to deposit more carbonaceous material on the catalyst particles.

I have found that, in carrying out a conversion operation in a reaction zone or a regeneration operation in a regeneration zone, if a relatively large amount of carbonaceous material is deposited or left on the powdered catalyst there is an increased preferential entrainment of catalyst fines in the gases or vapors carried overhead. According to the above I can carry out the reaction or regeneration in such a manner as to decrease the concentration of fines in the system.

In the drawing there is shown a diagrammatic form of apparatus which may be used to carry out my invention.

Referring now to the drawing the reference character 10 designates a line through which hydrocarbon oil as a liquid or vapor is passed. Suitable powdered catalyst passing through line 12 is mixed with the oil and the mixture passed through line 13 and introduced below distribution plate 14 in the reaction zone 16. The velocity of the vapors passing through the reaction zone 16 is so selected that the powdered catalyst assumes a fluidized condition in the reaction zone 16 and has a level 18 which is similar to the level of a violently boiling liquid.

In the preferred form of the invention the catalyst particles are withdrawn from the body of fluidized catalyst by means of a bottom withdrawal pipe or tube 22 which extends above the distribution plate 14. The pipe 22 is provided with a suitable valve 24 which may be used to control the amount of fluidized catalyst withdrawn from the reaction zone 16. During the conversion of hydrocarbons, carbonaceous material is deposited on the catalyst particles and it is necessary to remove the spent or fouled catalyst particles from the reaction zone 16 and regenerate them, as for example, by burning off the carbonaceous material. The withdrawn fouled catalyst particles are mixed with a suitable regenerating gas such as air which is introduced through line 25. The mixture of fouled catalyst particles and regenerating gas is passed through line 26 to a regeneration zone 28 to be more fully described hereinafter.

During the conversion of the hydrocarbons in the reaction zone 16 the reaction products in vapor form pass upwardly and leave the reaction zone 16 through line 32. These reaction vapors contain some entrained catalyst particles and it is desired to remove the entrained catalyst particles from these vapors. The vapors are introduced into a separating means 34 which is shown as a cyclone separator in the drawing. More than one cyclone separator may be used and if desired a Cottrell precipitator may be used as a final separation step for removing substantially all of the remaining catalyst particles from the reaction vapors. The separated catalyst particles collect in the bottom of the cyclone separator or other separating means 34 and are returned to the bottom drawoff tube 22 through line 36 or are returned to the body of catalyst in reaction zone 16. The separated reaction vapors pass overhead through line 38 and may be passed to suitable fractionating equipment to separate a desired fraction such as gasoline from higher boiling hydrocarbons.

Returning now to the regeneration of the fouled catalyst, the mixture of catalyst and regenerating gas is introduced into the regeneration zone 28 below the distribution plate 42. The velocity of the regenerating gas is so maintained that the catalyst particles undergoing regeneration behave similarly to a boiling liquid and have a level 44 similar to that described in connection with the level 18 in reaction zone 16. The catalyst particles are maintained in the regeneration zone for a period up to about 40 minutes to remove substantially all of the carbonaceous material from the catalyst particles.

The regenerated catalyst particles are withdrawn from the mass of fluidized catalyst particles undergoing regeneration through withdrawal pipe 46 which extends above the distribution plate 42. The withdrawal pipe 46 is provided with a control valve 48 for controlling the amount of catalyst withdrawn from the regeneration zone. The regenerated catalyst particles are then returned to the reaction zone 16. During regeneration it is important to keep the temperature below about 1200° F. to avoid damaging the catalyst particles. Where activated clay catalysts are used it is important to maintain the regeneration temperature below about 1150° F. to prevent deactivation of the catalyst particles.

As the regenerated catalyst particles are at a high temperature and above reaction or conversion temperature, my invention also contemplates injecting liquid oil or a mixture of oil vapors and liquid oil into the stream of hot regenerated catalyst so that the hot regenerated catalyst supplies the heat of vaporization and heat of conversion for the conversion operation. If desired, oil alone or steam and oil may be introduced through line 10 and mixed with the hot regenerated catalyst and this mixture in turn introduced into the reaction zone 16 below the distribution plate 14.

In cases where large amounts of heat are necessary to vaporize the oil feed and to convert gas oil constituents to gasoline it is preferred to mix inert solid finely divided particles with the catalyst particles. If the total amount of solid particles needed were all catalyst there would be too much catalyst present for the conversion and overconversion would result. My invention may also be used in the production of aviation gasoline and in such case the hot regenerated catalyst is used to supply the heat for vaporizing and for the conversion of the relatively light stock to produce the desired aviation gasoline.

During regeneration the regeneration gases pass upwardly in the regeneration zone 28 and leave this zone through line 52. The regeneration gases contain entrained solid catalyst particles and therefore the gases are passed through a separating means 54 which is shown in the drawing as a Cottrell precipitator. The separated regeneration gases leave the separating means through line 58 and are vented to the atmosphere.

In some cases a cyclone separator may be used ahead of the Cottrell precipitator but where the disengaging space or height 55 above the dense phase of catalyst in the regenerator having a level at 44 is properly selected and the proper gas velocity is selected, I prefer to omit the cyclone separator and use only a Cottrell precipitator. For example, with a disengaging height or space of about 10–15 feet and a velocity of about 1.4 to 1.5 ft./second in the disengaging space, catalyst entrainment is relatively low at about .003 or less pound per cubic foot of outlet regeneration gas. With disengaging heights of about 5 feet the velocity in the disengaging space is lower and is about 0.9 to 1 foot per second. These values are critical and a further decrease in velocity has little effect in further decreasing entrainment, whereas increasing the velocity causes excessive entrainment of catalyst.

The separated catalyst particles are introduced into the standpipe 72 having a control valve 74 at its lower end. The catalyst particles are introduced into line 13 and may be returned to the reaction zone 16. Preferably coarser regenerated catalyst particles are added to the lower portion of precipitator 54 to improve the flow characteristics of the catalyst fines.

During the operation of the process some of the larger catalyst particles are broken down into smaller particles and over a period of time there is an accumulation of these relatively small catalyst particles or fines. It is disadvantageous to maintain a large percentage of these fines in the circulating catalyst mixture as the finer particles reduce the density of a fluidized mass of solid particles and also require longer standpipes to produce the same pressure as is produced by a fluidized mixture of coarser catalyst particles. In the reaction zone and regeneration zone the density of the fluidized mixture is decreased due to the increased amount of finely divided catalyst particles.

According to my invention I periodically purge the catalyst mixture to remove selectively a large portion of the catalyst fines. This purging or separation is carried out in the same system used for conversion and regeneration. In the normal operation of converting gas oil to gasoline with powdered catalyst, carbonaceous material is deposited on the catalyst in the reaction zone so that the catalyst leaving the reaction zone contains from about 1% to 2% carbon by weight. In the regeneration zone, the carbonaceous materials are largely burned off so that the carbon on the catalyst leaving the regeneration zone normally contains only from about 0.2% to 1% carbon by weight.

I have found that if the concentration of carbonaceous material on the catalyst is increased in a given vessel substantially above 1% by weight at gas velocities of 1 ft./second or over, or above about 2% at gas velocities of 0.5 ft./second or over, the rate of entrainment of catalyst from the vessel is greatly increased. Moreover, the selectivity with which fine catalyst particles are entrained is also greatly increased. This is brought out in the following tabulation of results from a large pilot unit at relatively high entrainment rates.

| Average weight percent of 0-20 micron particles in the circulated catalyst | Average weight percent 0-20 micron particles in the entrained catalyst | |
| --- | --- | --- |
| | Less than 1% carbon on cat. | 2-5 wt. percent carbon on cat. |
| 10 | 25 | 80 |
| 30 | 50 | 90 or greater |

From the above disclosures it is apparent that in the operation of a reactor in which carbon is normally deposited to the extent of over 1% by weight of the catalyst, the use of two or more cyclone separators in series is necessary to recover the relatively large amount of catalyst entrained from this vessel. No cyclone separators are necessary, however, to recover the small amount of catalyst entrained from the regenerator during normal operation because of the low concentrations of carbonaceous materials remaining on the regenerated catalyst; a Cottrell precipitator alone is used to recover these small quantities of catalyst.

When it is desired to remove catalyst fines by the preferential entrainment above described, the catalyst during regeneration is regenerated to about 1% to 4% carbonaceous material by weight on the catalyst. When the operation is carried out to preferentially separate the catalyst fines the valve 74 in standpipe 72 is closed and the catalyst fines are withdrawn through line 76 having a valve 78. The separated catalyst fines may be diverted to another system, passed to storage, agglomerated by suitable means and returned to the system or otherwise handled or used.

In the usual conversion of gas oil to gasoline about 40% to 50% by volume of gasoline is obtained when using a powdered catalyst. An activated bentonite clay catalyst may be used having a size of about 200 to 400 standard mesh with less than about 50% by weight of 0 to 20 microns. Catalyst as produced may have more fines than desired and a portion of the fines is lost during the early stages of operation until an equilibrium is established. When it is desired to further reduce the amount of fines in the system, my process may be used.

The oil vapors passing through the reaction zone 16 above level 18 have a velocity of about 0.6 to 1.5 ft./second. During the conversion about 0.5% to 1.5% of carbonaceous material by weight is deposited on the catalyst particles. The catalyst particles are preferably purged or stripped with steam or other suitable gas and the purged catalyst particles are then passed to the regeneration zone 28 where a regenerating gas such as air is present to remove most of the carbonaceous material from the catalyst particles. The regenerated catalyst particles have a carbonaceous material deposit left of about 0.2% to 1% by weight on the catalyst. During regeneration the temperature is maintained below about 1150° F.

As the catalyst circulates through the system during conversion and regeneration some of the larger catalyst particles are broken down and fines are produced. These fines accumulate in the system and in admixture with the coarse catalyst reduce the density of the fluidized mixture in the reaction and regeneration zones. Also the density of the fluidized mixture in the standpipes is reduced and lower pressures are obtained for the same height of fluidized catalyst.

It is desirable to remove the excess catalyst fines from the system and according to my invention the regeneration of the catalyst is so controlled that larger amounts of carbonaceous material are left on the catalyst particles. For example, instead of regenerating the fouled catalyst down to about 0.5% by weight of the catalyst particles, the conditions in the regenerator are so altered that less of the carbonaceous material is burned off and about 2% or more by weight of the carbonaceous material builds up on the catalyst. This may be accomplished by reducing the regeneration air rate, by substituting steam or some other inert gas to replace part of the regeneration air normally used, by introducing oil or some other combustible material at the inlet of the regenerator to consume part of the oxygen in the regeneration air, or by lowering the regeneration temperature so that the rate of carbon burning is decreased.

Under these conditions of higher carbon concentration on catalyst there will be selective entrainment of the smallest catalyst particles or catalyst fines with the regeneration gases leaving the top of the regeneration zone 28. The fines are substantially completely removed from the gases in the Cottrell precipitator 54. The fines are withdrawn from the system through standpipe 72 and withdrawal line 76. These catalyst fines may be removed from the system, may be passed to storage or they may be further processed to agglomerate them and make larger catalyst particles for reuse in the system. Fresh make-up catalyst is preferably added to the regeneration zone 28 through valved line 78'.

Under ordinary conditions the velocity of the regeneration gases passing through the disengaging height or space 55 in the regenerator is about 1 to 1.5 ft./second. When the catalyst particles are only partly regenerated, the velocity of the gases in the disengaging space 55 may be increased in order to increase the rate at which the catalyst is entrained.

When the desired quantity of fines has been removed from the system, the concentration of carbonaceous material on the regenerated catalyst is reduced again to the low value maintained in normal operation and the normal operation is resumed.

In another form of my invention, fine catalyst particles are quickly and selectively removed in order to make possible a change from one type of operation during which certain desired products are produced to another type of operation during which other desired products are obtained. For example, when a plant is operating to make motor gasoline from Tinsley No. 4 gas oil in order to obtain the desired conversion it is necessary to circulate through the reactor only 4.5 pounds of catalyst for each pound of oil fed and to maintain in the reactor only 0.42 pound of catalyst for each pound per hour of oil fed. Under these conditions, and assuming that there was 0.6% of carbon on the catalyst by weight coming from the regenerator, the total carbon on the catalyst leaving the reactor is 1.3% due to laying down 0.7% during cracking. In order to regenerate the catalyst to 0.6% by weight of carbon on catalyst at normal regenerating conditions, the regenerator contains about 0.95 pound of catalyst for each pound per hour of oil fed to the reactor. Under these relatively mild conditions, the concentration of fine particles in the circulated catalyst may be allowed to build up to about 35% 0–20 micron particles by weight.

If it is now desired to operate this plant for the production of aviation gasoline from light Tinsley gas oil, and to obtain the proper conversion, the catalyst circulation rate through the reactor must be increased to 7.5 pounds per pound of oil fed and the catalyst maintained in the reactor must be increased to 0.71 pound for each pound per hour of oil fed. Also the carbon produced during the reaction will increase about 44%, so that 1.4 pounds of catalyst are required in the regenerator for each pound per hour of oil fed in order to regenerate the catalyst to the same carbon level as previously. The change from the motor gasoline operation to the aviation gasoline operation can be accomplished without reducing the total feed rate to the plant only by decreasing the concentration of fine catalyst particles in the circulated catalyst which will increase the concentrations of catalyst in the vessels and the standpipes.

In the above case, this can be accomplished by increasing the concentration of carbon on the regenerated catalyst to about 2% by weight of the catalyst and increasing the regeneration gas velocity to about 1.5 ft./second. In 2 to 3 hours sufficient fine catalyst will be lost to bring the concentration of fines from 35% to 10.5% by weight of 0–20 micron particles. The concentration of carbon on regenerated catalyst is then lowered again to 0.6% by weight of the catalyst, the air rate is adjusted to the desired value for the new operation, and fresh catalyst containing about 10.5% by weight of 0–20 micron particles is added to bring the levels in the vessels to values slightly greater than had been used in the motor gasoline operation. The increased concentrations of catalyst in the vessels provide the bulk of the additional catalyst required for the aviation gasoline operation, and the 75% increase in standpipe pressure buildup per foot of standpipe resulting from the increased catalyst density therein provides the added pressure head required to circulate the catalyst at the required higher rates.

It would be impossible to decrease the concentration of fines in the system by raising the air rate alone without increasing carbon concentration on the regenerated catalyst because of the low selectivity of removal of fines. For example, in going from 35% to 10.5% by weight of 0–20 micron particles by this method, over 80% of the material in the system would have to be removed. Somewhat better selectivity of removal of fines without increasing carbon concentration would be obtained by operating at low gas velocities, but because of the low entrainment rate thus obtained, even if as good selectivity of removal of fines could be obtained in this case, the time required for the removal of the fines would be almost ten times as great.

While I have shown one form of apparatus in the drawing in which the catalyst particles in dense fluidized mixture are removed from the bottom of the reaction zone and regeneration zone, it is within the contemplation of my invention to carry out the conversion and regeneration of the catalyst particles in a system where the catalyst passes entirely overhead from the reaction zone and from the regeneration zone. In such cases the catalyst removed from the vaporous reaction products in the cyclone system 34 is passed to a standpipe which delivers the fouled catalyst to the regeneration zone in admixture with a regenerating gas. Similarly on the regeneration side the catalyst separated from the regeneration gases is passed to a standpipe and returned to the reaction zone 16 for reuse in the conversion operation. As all the catalyst passes overhead with the gases or vapors from the reaction vessel, it will be usually necessary to include additional separating means such as cyclones.

Preferably the fouled catalyst withdrawn through the pipe 22 is purged with a purging gas such as steam to remove volatile hydrocarbons from the fouled catalyst before regenerating the catalyst. If desired, the regenerated catalyst particles leaving the regeneration zone may also be purged with a purging gas such as steam to remove any traces of oxygen or oxygen-containing gas in the fluidized mixture of regenerated catalyst.

The system may be used to operate with heated oil vapors passing through line 10 which are mixed with the hot regenerated catalyst particles passing through line 12. In certain instances liquid oil partly preheated is mixed with hot regenerated catalyst and sufficient amounts of catalyst or catalyst plus inert finely divided solid material are used to vaporize the liquid oil and supply the heat necessary to convert the oil to lighter constituents such as gasoline. Where using liquid feed, the liquid oil is preferably introduced through line 10 into the base of the draw-off line 12 from the regeneration zone 28 so that the oil is directly mixed with the hot regenerated catalyst.

While I have specifically disclosed selectively removing fines on the regeneration side of the process, my invention may also be used to selectively remove fines on the reaction side or during the conversion.

While I have shown one form of apparatus in the drawing and have given certain specific examples of various operating conditions, it is to be understood that these are for illustration only and various changes and modifications may be made without departing from the spirit of the invention.

I claim:

1. In a process wherein hydrocarbons are converted in the presence of finely divided catalyst whereby carbonaceous material is deposited on the catalyst and the catalyst is regenerated in a regeneration zone after a conversion operation and during the normal regeneration the carbonaceous material on the catalyst particles is substantially completely removed, said catalyst containing fines, the step of selectively removing catalyst fines from the catalyst during regeneration which comprises periodically regenerating the catalyst by burning so that at least part of the carbonaceous material is not removed from the catalyst whereby the regeneration gases leaving said regeneration zone entrain more catalyst fines than when the catalyst particles are regenerated during substantially complete regeneration and the carbonaceous material is substantially completely removed.

2. A process according to claim 1 wherein the velocity of the gases passing through said regeneration zone is increased to increase the rate of removal of fines from said regeneration zone.

3. In a process wherein hydrocarbons are converted in the presence of finely divided catalyst which thereby becomes fouled and the fouled catalyst is regenerated with an oxygen-containing gas in a regeneration zone by burning after a conversion operation and during normal regeneration the carbonaceous content of the catalyst particles is reduced to less than about 1.0% by weight on the catalyst, the step of reducing the amount of regenerating gas supplied to the regeneration zone to decrease the burning and to increase the carbonaceous material on the catalyst to above about 1.5% during regeneration and then separating partly regenerated catalyst particles from the regeneration gases and during such separation selectively removing catalyst fines from coarse catalyst by retaining fines in suspension in the gases and thereafter removing fines from the process.

4. In a process for conversion of hydrocarbons in which powdered catalyst is contacted with hydrocarbon vapors in a conversion zone and fouled catalyst is separated from conversion products and the fouled catalyst contains carbon and is contacted with a regenerating oxidizing gas flowing upwardly in a regeneration zone to form a relatively dense suspension and there is loss by entrainment of catalyst fines in the gas passing overhead from said regeneration zone during normal operation of the process, the steps which comprise selectively removing from the process a larger portion of catalyst fines than that lost by entrainment during normal operation of the process by incompletely regenerating and carrying overhead and rejecting from the process a larger portion of fines containing more carbonaceous material than substantially completely regenerated catalyst.

5. In a process wherein hydrocarbons are converted in the presence of finely divided solid catalyst and the catalyst thereby becomes spent by deposition of carbon thereon and the spent catalyst is regenerated in a regeneration zone by oxidizing with a stream of an oxidizing gas at a rate that normally reduces the carbon on the catalyst to substantially below 1% by weight and the thus regenerated catalyst is found to contain more very fine particles than desired, the method of preparing a normally regenerated catalyst mass that contains not more than the desired amount of very fine particles comprising continuing conversion of hydrocarbons and during regeneration of the spent catalyst therefrom, decreasing the rate of oxidation of the carbon deposit so that regeneration is incomplete and substantially above 1% by weight of carbon is left on the catalyst, while maintaining the velocity of the gas stream leaving the regeneration zone sufficient to entrain in said gas stream a catalyst composition consisting predominantly of undesired very fine catalyst particles with only a minor proportion of larger catalyst particles thus leaving behind an unentrained catalyst mass, preventing the return of the entrained particles to the unentrained remaining catalyst mass, and after said remaining catalyst mass has attained a sufficiently low content of undesired very fine particles, increasing the oxidation to the normal rate to again reduce the carbon left on said remaining catalyst mass to substantially less than 1% by weight, whereby this remaining catalyst mass now having a sufficiently low content of undesired very fine catalyst particles may be used for further conversion of hydrocarbons.

6. In a process wherein hydrocarbons are converted in the presence of finely divided solid catalyst and the catalyst thereby becomes spent by deposition of carbon thereon and the spent catalyst is regenerated in a regeneration zone by oxidizing with a sufficient amount of an oxidizing gas to normally reduce the carbon on the catalyst to a relatively low percentage by weight and the thus regenerated catalyst is found to contain more very fine particles than desired, the method of preparing a normally regenerated catalyst mass that contains not more than the desired amount of very fine particles which comprises continuing conversion of hydrocarbons and during regeneration of the spent catalyst therefrom, decreasing the oxidation of the carbon deposit so that regeneration is incomplete and a larger percentage of carbon by weight is left on the catalyst particles, while maintaining the velocity of the oxidizing gas leaving the regeneration zone sufficient to entrain in the gas catalyst mixture consisting predominantly of undesired very fine catalyst particles with only a minor proportion of larger catalyst particles thus leaving behind an unentrained catalyst mass, preventing the return of the entrained particles to the unentrained remaining catalyst mass, and after said remaining catalyst mass has attained a sufficiently low content of undesired very fine particles, increasing the oxidation during regeneration to again reduce the carbon left on said remaining catalyst mass to the relatively low percentage by weight above mentioned, whereby this remaining catalyst mass now having a sufficiently low content of undesired very fine catalyst particles may be used for further conversion of hydrocarbons.

EDWARD W. S. NICHOLSON.